(12) United States Patent
Georgiou et al.

(10) Patent No.: US 11,862,145 B2
(45) Date of Patent: Jan. 2, 2024

(54) DEEP HIERARCHICAL FUSION FOR MACHINE INTELLIGENCE APPLICATIONS

(71) Applicant: Behavioral Signal Technologies, Inc., Los Angeles, CA (US)

(72) Inventors: Efthymis Georgiou, Athens (GR); Georgios Paraskevopoulos, Athens (GR); James Gibson, Los Angeles, CA (US); Alexandros Potamianos, Santa Monica, CA (US); Shrikanth Narayanan, Santa Monica, CA (US)

(73) Assignee: Behavioral Signal Technologies, Inc., Los Angeles, CA (US)

( * ) Notice: Subject to any disclaimer, the term of this patent is extended or adjusted under 35 U.S.C. 154(b) by 116 days.

(21) Appl. No.: 16/852,872

(22) Filed: Apr. 20, 2020

(65) Prior Publication Data

US 2020/0335092 A1 Oct. 22, 2020

Related U.S. Application Data

(60) Provisional application No. 62/836,647, filed on Apr. 20, 2019.

(51) Int. Cl.
*G10L 15/16* (2006.01)
*G10L 25/63* (2013.01)
(Continued)

(52) U.S. Cl.
CPC .............. *G10L 15/16* (2013.01); *G06N 20/00* (2019.01); *G10L 15/25* (2013.01); *G10L 25/63* (2013.01)

(58) Field of Classification Search
CPC ......... G10L 15/16; G10L 15/25; G10L 25/63; G10L 25/30; G06N 20/00; G06N 3/0445;
(Continued)

(56) References Cited

U.S. PATENT DOCUMENTS

| 6,598,020 B1* | 7/2003 | Kleindienst | ............. G10L 13/08 704/270.1 |
| 7,684,984 B2* | 3/2010 | Kemp | ................... G10L 15/065 704/235 |

(Continued)

OTHER PUBLICATIONS

Gu et al. "Multimodal affective analysis using hierarchical attention strategy with word-level alignment." Proceedings of the 56th Annual Meeting of the Association for Computational Linguistics, pp. 2225-2235 Melbourne, Australia, Jul. 15-20, 2018 (Year: 2018).*

(Continued)

*Primary Examiner* — Jesse S Pullias
(74) *Attorney, Agent, or Firm* — Occhiuti & Rohlicek LLP (57) ABSTRACT

A method for processing multi-modal input includes receiving multiple signal inputs, each signal input having a corresponding input mode. Each signal input is processed in a series of mode-specific processing stages. Each successive mode-specific stage is associated with a successively longer scale of analysis of the signal input. A fused output is generated based on the output of a series of fused processing stages. Each successive fused processing stage is associated with a successively longer scale of analysis of the signal input. Multiple fused processing stages receive inputs from corresponding mode-specific processing stages, so that the fused output depends on the multiple of signal inputs.

13 Claims, 2 Drawing Sheets

(51) Int. Cl.
*G10L 15/25* (2013.01)
*G06N 20/00* (2019.01)

(58) Field of Classification Search
CPC .......... G06N 3/045; G06N 3/08; G06F 40/20; G06F 40/279
See application file for complete search history.

(56) References Cited

U.S. PATENT DOCUMENTS

| | | | |
|---|---|---|---|
| 9,047,871 B2* | 6/2015 | Dimitriadis | G10L 17/26 |
| 2005/0114142 A1* | 5/2005 | Asukai | H04M 1/72427 |
| | | | 704/270 |
| 2013/0132088 A1* | 5/2013 | Kim | A61B 5/165 |
| | | | 704/270 |
| 2018/0225116 A1* | 8/2018 | Henry | G06N 3/04 |
| 2019/0341025 A1* | 11/2019 | Omote | G10L 25/30 |

OTHER PUBLICATIONS

S. Hochreiter and J. Schmidhuber, "Long short-term memory," Neural computation, vol. 9, No. 8, pp. 1735-1780, 1997.

D. Bahdanau, K. Cho, and Y. Bengio, "Neural machine translation by jointly learning to align and translate," arXiv preprint arXiv:1409.0473, 2014.

A. Zadeh, R. Zellers, E. Pincus, and L.-P. Morency, "Mosi: multimodal corpus of sentiment intensity and subjectivity analysis in online opinion videos," arXiv preprint arXiv:1606.06259, 2016.

A. Zadeh, P. P. Liang, S. Poria, P. Vij, E. Cambria, and L.-P. Morency, "Multi-attention recurrent network for human communication comprehension," in Thirty-Second AAAI Conference on Artificial Intelligence, 2018.

J. Pennington, R. Socher, and C. Manning, "Glove: Global vectors for word representation," in Proceedings of the 2014 conference on empirical methods in natural language processing (EMNLP), 2014, pp. 1532-1543.

A. Zadeh, M. Chen, S. Poria, E. Cambria, and L.-P. Morency, "Tensor fusion network for multimodal sentiment analysis," in Proceedings of the 2017 Conference on Empirical Methods in Natural Language Processing, 2017, pp. 1103-1114.

[7] G. Degottex, J. Kane, T. Drugman, T. Raitio, and S. Scherer, "Covarep a collaborative voice analysis repository for speech technologies," in 2014 ieee international conference on acoustics, speech and signal processing (icassp). IEEE, 2014, pp. 960-964.

J. Yuan and M. Liberman, "Speaker identification on the scotus corpus," Journal of the Acoustical Society of America, vol. 123, No. 5, p. 3878, 2008.

S. Poria, E. Cambria, and A. Gelbukh, "Deep convolutional neural network textual features and multiple kernel learning for utterance-level multimodal sentiment analysis," in Proceedings of the 2015 conference on empirical methods in natural language processing, 2015, pp. 2539-2544.

Y. Gu, K. Yang, S. Fu, S. Chen, X. Li, and I. Marsic, "Multimodal affective analysis using hierarchical attention strategy with word-level alignment." in Proceedings of the conference. Association for Computational Linguistics. Meeting, vol. 2018, 2018, p. 2225.

Y.-H. H. Tsai, P. P. Liang, A. Zadeh, L.-P. Morency, and R. Salakhutdinov, "Learning factorized multimodal representations," arXiv preprint arXiv:1806.06176, 2018.

R. Pascanu, T. Mikolov, and Y. Bengio, "On the difficulty of training recurrent neural networks," in International conference on machine learning, 2013, pp. 1310-1318.

D. P. Kingma and J. Ba, "Adam: A method for stochastic optimization," arXiv preprint arXiv:1412.6980, 2014.

A. Paszke, S. Gross, S. Chintala, G. Chanan, E. Yang, Z. DeVito, Z. Lin, A. Desmaison, L. Antiga, and A. Lerer, "Automatic differentiation in pytorch," 2017.

* cited by examiner

DEEP HIERARCHICAL FUSION FOR MACHINE INTELLIGENCE APPLICATIONS

CROSS-REFERENCE TO RELATED APPLICATIONS

This application claims the benefit of U.S. Provisional Application No. 62/836,647, filed on Apr. 20, 2019, which is incorporated herein by reference.

BACKGROUND

This application relates to hierarchical data fusion, and more particularly to such fusion in machine learning applications, including sentiment analysis applications from signals including speech signals.

Fusion of information from multiple sources can yield improved performance in machine intelligence applications. This is a popular technique for modeling phenomena which are realized through multiple signals or channels. e.g., modeling audio-visual expressions of human emotion. Traditionally, this fusion is achieved in machine learning systems by combining either the signal streams (or transformations thereof) and learning a model from this combined signal (early fusion) or by learning separate models for each signal and then using a subsequent model to combine the individual predictions into a fused decision (late fusion). While these approaches may yield performance improvements they fail to take advantage of the multiple levels of abstraction that information may be carried in co-evolving signal streams.

SUMMARY

In one aspect, in general, a new data fusion approach addresses this limitation by fusing information streams at multiple levels of abstraction using a hierarchical deep methodology. The deep hierarchical fusion method outperforms other proposed fusion techniques proposed in the literature.

Deep hierarchical fusion is especially relevant for human emotion recognition, as humans generate a variety of co-varying signals when expressing an emotional state (e.g., speech (acoustic and linguistic), facial expressions, and physiological signals). Results demonstrate that a deep hierarchical fusion method using speech and text significantly outperforms other state-of-the-art methods for the emotion recognition task.

In another aspect, in general, a method for processing multi-modal input includes receiving multiple signal inputs, each signal input having a corresponding input mode. Each signal input is processed in a series of mode-specific processing stages (111-119, 121-129 in FIG. 1). Each successive mode-specific stage is associated with a successively longer scale of analysis of the signal input A fused output is generated based on the output of a series of fused processing stages (191-199). Each successive fused processing stage is associated with a successively longer scale of analysis of the signal input. Multiple fused processing stages receive inputs from corresponding mode-specific processing stages, so that the fused output depends on the multiple of signal inputs. The input modes corresponding to the signal inputs can include an audio input mode and an text input mode. The successively longer scales of analysis can include a word scale analysis and a sentence or utterance scale analysis. At least some of the processing stages can optionally include feed-forward neural network encoders, or long short-term memory structures.

Inventive aspects and features can include the following:
1. Method and System for deep hierarchical fusion for machine intelligence applications.
2. System for integrating information from multiple information signals at a variety of granularities (e.g., time scales).
3. The fusion can be performed in a unimodal fashion such as different measurements of the same modality for example fusion of information from multiple sources, e.g., microphones).
4. The fusion can be performed in a unimodal fashion such as different representations or transformation of the same modality for example fusion of information from multiple wavelet/spectrotemporal decompositions.
5. The fusion can be performed in a multimodal fashion such as fusion of information from audio and text signals.
6. The system enables each information signal model to be trained in a synchronous matter to enable coordination of different modalities at different levels of abstraction (e.g., various granularities).
7. This system allows for fusion of the various information signal representations at each level of abstraction.
8. The fusion of the information signal representations can be achieved via a variety of techniques including but not limited to concatenation, averaging, pooling, conditioning, product, transformation by forward or recursive neural network layers.
9. The fusion of the information signal representations may include an attention module that takes as input the information signal representations and weighs their contribution towards the fused representation.
10. This fused representation is propagated through various levels of abstraction to enable machine inference in the final layer.
11. This method can enable classification such as recognizing an emotional state.
12. This method can enable change tracking such as varying human emotional/behavioral states.
13. This method can be applied in either the native signal domain or some transform domain such as time-frequency signals such as audio spectrograms or wavelet decompositions of physiological signals.
14. The system can be of arbitrary depth.
15. The hierarchical representation of the various layers of abstraction can correspond to varying granularities of the information signals (e.g., time-scales) for example for audio text fusion these could correspond to phone, syllable, word, and utterance levels.
16. The hierarchical representation of the various layers of abstraction can be learned implicitly from data.
17. The hierarchical representations of some layers of abstraction can be learned implicitly from data and other layers of abstraction can correspond to varying granularities of the information signals.

DETAILED DESCRIPTION

1 Overview

Figure 1:
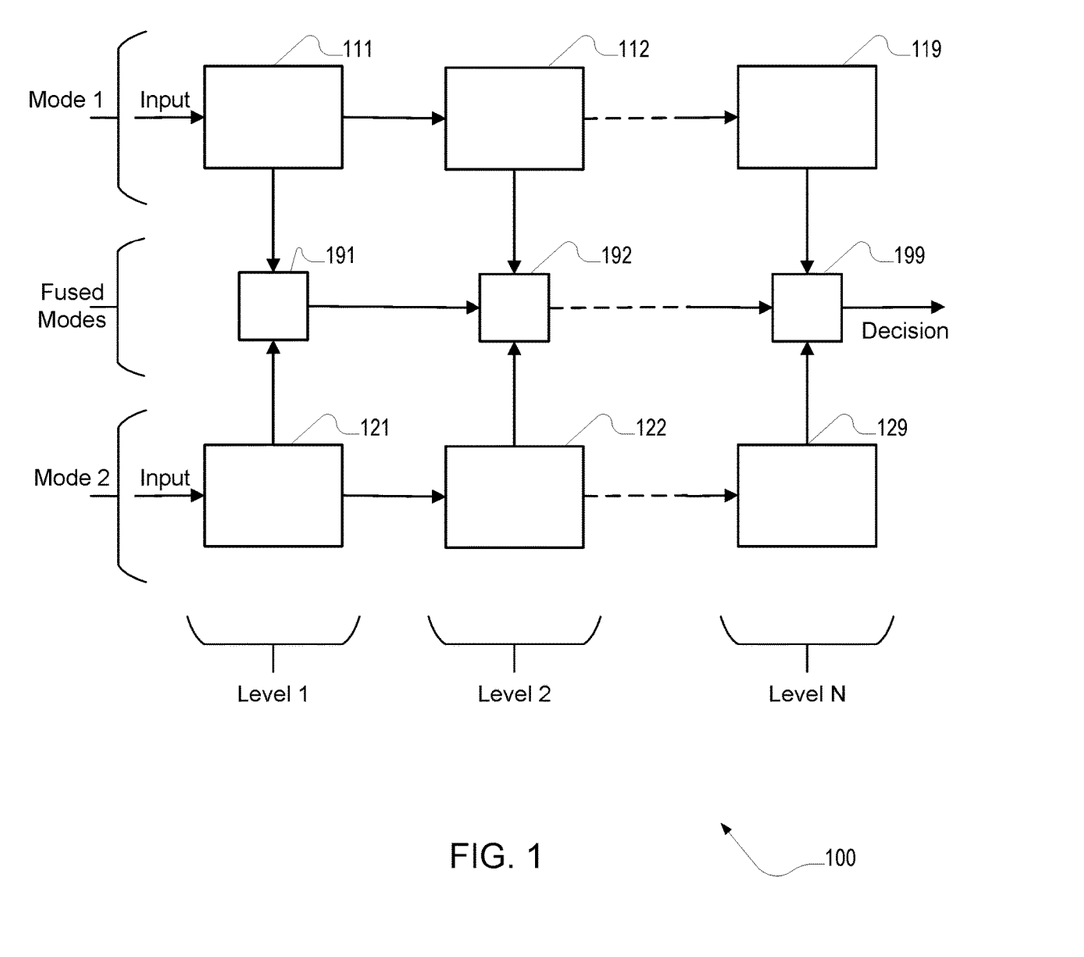
FIG. 1 is a block diagram of a fusion system.

Referring to FIG. 1, a deep fusion system 100 has inputs in two or more modes, represented in the figure as a representative mode 1 and mode 2. For example, the input in mode 1 is text input, for example, represented by words, or alternatively tokenized representations derived from the words or subword units, with the text in some examples being derived by speech recognition from an audio input. Mode 2 is speech input, represented as an acoustic waveform, spectrogram, of other signal analysis of the audio signal. A first processing path processes the mode 1 input in a series of stages, represented as processing stage 1 (111), stage 2 (112), up to stage N (119). For example, the stages may correspond to different time scales, such as syllables, words, sentences, conversational turns, and the like, or deep representation at the same time scale, with each stage processing the input at a more aggregated level. Similarly, a second mode is processed by the system, as represented by the input in mode 2 in the figure. The processing stages 1 to N (121, 122, 129) process the audio input at corresponding levels to the processing of the mode 1 text input.

Rather than each of the modes being processed to reach a corresponding mode-specific decision, and then forming some sort of fused decision from those mode-specific decisions, multiple (e.g., two or more, all) levels of processing in multiple modes pass their state or other output to corresponding fusion modules (191, 192, 199), shown in the figure with each level having a corresponding fusion module. Each fusion module at one level passes its output to the fusion module a the next level, with the final fusion module providing the overall decision output.

In one example, the first mode is a text mode in which processing stage 1 (111) operates at a word level. In particular, the stage implements a bidirectional long short-term memory (BiLSTM) neural network, a special case of a Recurrent Neural Network (RNN). The values provided from the mode 1 stage 1 processor (111) to the fused stage 1 processor (191) includes the state maintained in the LSTM structure. The second mode is an audio mode such that mode 2 stage 1 (121) processes audio samples, or alternatively spectrogram representations or other features extracted from the audio samples, in a manner aligned with the text tokens processed in the mode 1 stage 1 processor. That is, the operation of the stage 1 processors is synchronized. For example, the mode 2 stage 1 processor may implement an RNN/BiLSTM, and again the state of the LSTM used in the signal passed from the mode 2 level 1 stage to the fused level 1 stage. The fused level 1 stage also implements an LSTM structure. The utterance stage 2, and the high-level stage 3 have similar structures.

The structure shown in FIG. 1 is trained using any of a variety of neural network weight estimation techniques. In some examples, each of the modes is first pretrained independently, before combined to perform fused training.

2 Preferred Embodiment

Figure 2:
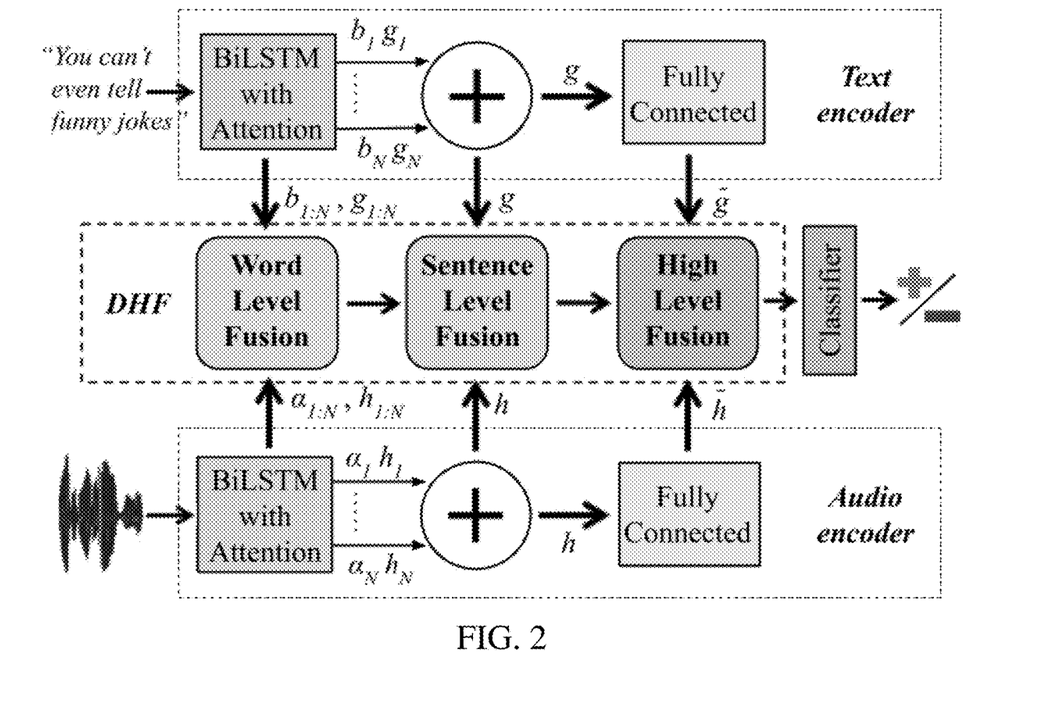
FIG. 2 is an architecture of a preferred embodiment.

As shown in FIG. 2, the proposed architecture consists of three parts 1) a text encoder 2) an audio encoder and 3) a Deep Hierarchical Fusion (DHF) network. The two independent modal encoders supply the DHF network with features at each neural layer shown as vertical arrows in FIG. 2. The DHF network fuses the information in multiple interconnected levels and finally feeds its output to a classifier that performs sentiment analysis.

There are two directions of the flow of the information in the architecture. The first one, illustrated by the vertical arrows, has already been described and depicts the different level representations which are supplied to the DHF. The second one, denoted by the horizontal arrows simulates the forward propagation of the information through the deep network. For the specific task of performing sentiment analysis on spoken sentences, the fusion of textual and acoustic information is performed in three stages. The word-level accepts as inputs two independent modality representations from the encoders. The derived fused representation is then fed-forward to the sentence level which exploits not only the prior fused information, but also re-uses audio and text features, introducing multiple learning paths to the overall architecture. Our DHF network ends up with the high level fusion representation that resides in a (more abstract) multimodal representation space.

2.1 Text Encoder

To extract text representations, we use bidirectional LSTM layers [1], which process an input sequentially and are able to capture time-dependencies of language representations. Bidirectional stands for processing an input both forward and backwards. The hidden state $g_i$ of the BiLSTM, at each timestep can be viewed as:

$$g_i = \overrightarrow{g_i} \| \overleftarrow{g_i}, i=1, \ldots, N \tag{1}$$

where N is the sequence length, $\|$ denotes concatenation and $\overrightarrow{g_i}, \overleftarrow{g_i} \in \mathbb{R}^D$ are the forward and backward hidden state representations for the i-th word in the sequence.

Since elements of the input sequence do not contribute equally to the expression of the sentiment in a message, we use an attention mechanism that aggregates all hidden states $g_i$, using their relative importance $b_i$ by putting emphasis on the impactful components of the sequence [2].

This structure is described as follows:

$$e_i = \tanh(W_g g_i + b_g), e_i \in [-1, 1] \tag{2}$$

$$b_i = \frac{\exp(e_i)}{\sum_{i=1}^{N} \exp(e_t)}, \sum_{i=1}^{N} b_i = 1 \tag{3}$$

$$g = \sum_{i=1}^{N} b_i g_i, g \in \mathbb{R}^{2D} \tag{4}$$

where the attention weights $W_g$, $b_g$ adapt during training. Formally, the attention mechanism feeds every hidden state $g_i$ to a nonlinear network that assigns an energy value $e_i$ to every element (2). These values are then normalized via (3), to form a probability distribution and a weight $b_i$ is attached to each hidden representation. We compute the representation g of the whole message as the sum (4) of the weighted representations. Since the sequential information is modeled, a fully connected network is applied to perform the classification task. The high-level representation $\tilde{g} \in \mathbb{R}^{2D}$ extracted by the fully connected layers can be described as:

$$\tilde{g} = W_t g + b_t \tag{5}$$

where $W_t$ and $b_t$ are the trainable parameters. After the training procedure we strip the output layer off and we use the text subnetwork as the text encoder, as it can be seen in FIG. 2. This encoder provides the DHF network with three different high-level representations, namely word-level features $b_{1:N}$, $g_{1:N}$, sentence-level representations g and high-level features $\tilde{g}$.

2.2 Audio Encoder

A similar approach is followed regarding the acoustic module, since speech features are aligned in word-level and then averaged, resulting in an audio representation for each word. We use a BiLSTM (6):

$$h_i = \vec{h_i} \| \overleftarrow{h_i}, i=1,\ldots,N \qquad (6)$$

where $h_i \in \mathbb{R}^H$ describes the hidden unit of the i-th timestep. An attention mechanism (2), (3), (7) is also applied:

$$h = \sum_{i=1}^{N} a_i h_i, h \in \mathbb{R}^{2H} \qquad (7)$$

with the respective attention layer parameters denoted as $W_h$ and $b_h$. Similarly to the text encoder 2.1, a high-level audio representation $\tilde{h} \in \mathbb{R}^{2H}$ is learned, via a fully connected network with trainable weight parameters $W_a$, $b_a$. This representation is, in turn, given to an output softmax layer which performs the classification. After the learning process, the softmax layer of the speech classifier is no longer considered as part of the network. The remaining submodules form the audio encoder of FIG. 2 and the word-level $a_{1:N}$, $h_{1:N}$, sentence-level h and high-representation-level $\tilde{h}$ features are fed to the DHF.

2.3 DHF

As shown in FIG. 2, the DHF network is made up of three hierarchical levels, which are described in the following subsections.

2.3.1 Word-Level Fusion Module

The word-level is the first fusion stage and aims to capture the time-dependent cross-modal correlations. This subnetwork accepts as inputs the word-level features $a_{1:N}$, $h_{1:N}$ and $b_{1:N}$, $g_{1:N}$ from audio and text encoder respectively. At every i-th timestep, we apply the following fusion-rule:

$$c_i = a_i h_i \| b_i g_i \| h_i \odot g_i, \qquad (8)$$

where $\odot$ denotes the Hadamard product and $c_i \in \mathbb{R}^{2(2H+D)}$ is the fused time-step representation. These representations form a sequence of length N and are passed to a BiLSTM network with an attention mechanism (2), (3), (9), which outputs the word-level fused representations:

$$f_W = \sum_{i=1}^{N} k_i f_i, f \in \mathbb{R}^{2W} \qquad (9)$$

where $k_i$ is the fused attention weight at i-th timestep and $f_i$ is the concatenation of hidden states $\vec{f_i}$, $\overleftarrow{f_i}$ which belong to a W-dimensional space. We consider $W_f$ and $b_f$ as the respective attention trainable parameters.

2.3.2 Sentence-Level Fusion Module

This is the second level in the fusion hierarchy and as stated by its name, it fuses sentence-level representations. This module accepts as inputs three information flows 1) sentence-level representation g from the text encoder, 2) sentence-level representation h from the audio encoder and 3) the previous-level fused representation $f_W$. The architecture of the network consists of three fully connected layers. Instead of directly fusing g with h, we apply two fully connected networks which learn some intermediate representations which are then fused with $f_W$ through a third network and produce a new fused representation $f_U \in \mathbb{R}^{2W}$.

2.3.3 High-Level Fusion Module

The last fusion hierarchy level combines the high-level representations of the textual and acoustic modalities, $\tilde{g}$ and $\tilde{h}$, with the sentence-level fused representation $f_U$. This high-dimensional representation is passed through a Deep Neural Network (DNN), which outputs the sentiment level representation $f_S \in \mathbb{R}^M$. The goal of this module is to project this concatenated representation to a common multimodal space.

2.4 Output Layer

After the multimodal information is propagated through the DHF network, we get a high-level representation $f_S$ for every spoken sentence. The role of the linear output layer is to transform this representation to a sentiment prediction. Consequently, this module varies according to the task. For binary classification, we use a single sigmoid function with binary cross entropy loss, whereas a softmax function with a cross entropy loss is applied in the multi-class case.

3 Experimental Methodology

Our experiments were carried out in the CMU-MOSI [3] database, a collection of online videos in which a speaker is expressing an opinion towards a movie. Every video consists of multiple clips, where each clip contains a single opinion which is expressed in one or more spoken sentences. MOSI database contains 2199 opinion segments with a unique continuous sentiment label in the interval [−3, +3]. We make use of binary, five-scale and seven-scale labels.

3.1 Data Preprocessing

We preprocess our data with CMU-Multimodal SDK (mmsdk) [4] tool, which provides us with an easy way for downloading, preprocessing, aligning and extracting acoustic and textual features. For the text input we use GloVe embeddings [5]. Specifically, each spoken sentence is represented as a sequence of 300-dimensional vectors. As for the acoustic input, useful features such as MFCCs, pitch tracking and voiced/unvoiced segmenting [6] are used. All acoustic features (72-dimensional vectors) are provided by mmsdk-tool, which uses COVAREP [7] framework. Word-alignment is also performed with mmsdk tool through P2FA [8] to get the exact time-stamp for every word. The alignment is completed by obtaining the average acoustic vector over every spoken word.

3.2 Baseline Models

We briefly describe the baseline models which our proposed approach is compared to.

- C-MKL [9]: uses a CNN structure to capture high-level features and feeds them to a multiple kernel learning classifier.
- TFN [6]: uses Kronecker products to capture unimodal, bimodal and trimodal feature interactions. Authors use the same feature set with the one described in subsection 3.1.
- FAF [10]: uses hierarchical attention with bidirectional gated recurrent units at word level and a fine tuning attention mechanism at each extracted representation. The extracted feature vector is passed to a CNN which performs the final decision.
- MFM [11]: is a GAN, which defines a joint distribution over multimodal data. It takes into account both the generative and the discriminative aspect and aims to generate missing modality values, while projecting them into a common learned space. The feature set in this study is the same with the one we describe in 3.1.

3.3 Experimental Setup

The hidden state hyperparameters H, D, W are chosen as 128, 32, 256, respectively. A 0.25 dropout rate is picked for all attention layers. Furthermore, fully connected layers in both encoders use Rectified Linear Units (ReLU) and dropout with 0.5 value is applied to the audio encoder. The DHF hyperparameter M is chosen as 64 and all its fully connected layers use ReLU activation functions and a 0.15 dropout probability. Moreover, a gradient clipping value of 5 is applied, as a safety measure against exploding gradients [12]. Our architecture's trainable parameters are optimized using Adam [13] with 1e−3 learning rate and 1e−5 as weight decay regularization value. For all models, the same 80-20 training-testing split is used and we further separate 20% of the training dataset for validation. A 5-fold cross validation is used. All models are implemented using PyTorch [14] framework.

4 Results

As shown in Table 1, the proposed method consistently outperforms other well-known approaches. Specifically in binary classification task, which is the most well-studied, the proposed architecture outperforms by a small 0.5% margin all other models. As for the five and seven class task we outperform other approaches by 5.87% and 2.14% respectively, which imply the efficacy of the DHF model. Missing values indicate non reported performance measure in the corresponding papers.

Table 2 illustrates a comparison between the text, the audio and the fusion classifier within the proposed model. Every column describes a unique approach. The most interesting part of our experiments is that the proposed method achieves larger performance gains, ΔFusion, than the other proposed approaches, as it can be seen in Table 2. Even though the unimodal classifiers for the binary task are not as accurate as in other approaches (FAF, TFN), the DHF boosts the

TABLE 1

| Task | Binary | | 5 class | 7 class |
|---|---|---|---|---|
| | Acc (%) | F1 | Acc (%) | Acc (%) |
| CMK-L | 73.6 | 75.2 | — | — |
| TFN | 75.2 | 76.0 | 39.6 | — |
| FAF | 76.4 | 76.8 | — | — |
| MFM | 76.4 | 76.3 | — | 35.0 |
| DHF | 76.9 | 76.9 | 45.47 | 37.14 | performance enough to outperform them in the multimodal classification. Specifically, the results indicate that our method improves the performance by 3.1%, whereas the state-of-the-art approach FAF shows a relative improvement of 1.4%.

TABLE 2

| Model | FAF Acc (%) | TFN Acc (%) | DHF Acc (%) |
|---|---|---|---|
| Text | 75.0 | 74.8 | 73.8 |
| Audio | 60.2 | 65.1 | 63.3 |
| Fusion | 76.4 | 75.2 | 76.9 |
| ΔFusion | ↑1.4 | ↑0.4 | ↑3.1 |

Table 3 shows the results of an ablation study regarding the contribution of different DHF modules. Three experiments are carried out and in each one, a level of hierarchy is being subtracted. Specifically the first row corresponds to a DHF architecture without the High-Level Fusion module (see FIG. 2). The Sentence-Level representation is fed to a softmax classifier in this case. The next two rows describe the DHF without the Sentence-Level and Word-Level Fusion modules respectively. We notice that higher hierarchy levels are more important for the model performance. This demonstrates that the impact of the earlier levels of hierarchy is being decreased as new representations are extracted in the following levels, denoting that the model deepens its learning on feature representations.

Finally, we tested the robustness of the proposed model, by adding Gaussian noise upon the input data. The first two columns of table 4 detail the noise deviation $T_{std}$, $A_{std}$ on the text and audio data respectively. The next three columns describe each classifier's accuracy. We notice that a 4.7% performance decay in the text classifier, yields a 4.1% decay in the fusion method. This is expected while the input noise affects both the text and multimodal classifier. Additionally, the

TABLE 3

| Model | Accuracy (%) | F1 |
|---|---|---|
| $DHF_{No\ High-Level}$ | 75.0 | 74.8 |
| $DHF_{No\ Sent-Level}$ | 75.5 | 75.4 |
| $DHF_{No\ Word-Level}$ | 75.7 | 75.6 |
| DHF | 76.9 | 76.9 | third row shows a 4% and 8.3% reduction in text and audio performance respectively, while fusion model only shows a 6.5% decay. It can be observed that for reasonable amounts of input data noise, the DHF outperforms the textual classifier.

TABLE 4

| Noise | | Accuracies (%) | | |
|---|---|---|---|---|
| $T_{std}$ | $A_{std}$ | Text | Audio | DHF |
| 0.0 | 0.0 | 73.81 | 63.33 | 76.91 |
| 0.3 | 0.0 | 69.05 | 63.33 | 72.86 |
| 0.3 | 0.01 | 69.32 | 55 | 70.48 |

5 Alternatives and Implementations

Generalizations of the data fusion can include the following:

The method and system can be applied for a variety of machine inference tasks including, but not limited to:

Estimating and tracking human emotional states and behaviors from human generated signals (e.g., speech, language, physical movements, eye gaze, physiological signals, etc.).

Estimation of human traits such as identity, age, gender, and personality aspects from human generated signals (e.g., speech, language, physical movements, eye gaze, physiological signals, etc.).

Event prediction and tracking in multimedia signals such as automated scene analysis, advertisement identification, character tracking, and demographic information (gender, race, age, etc.) from signals generated within the multimedia (e.g., audio including speech and musical scores; video signal; and closed captions/scripts).

Security applications.

Fusion can produce classification results at different timescales (this problem is known as tracking or recognition, e.g., speech recognition at the word level timescale) for example for fusion of text and speech modalities one can produce results at the phone, syllable, word, sentence, paragraph or document level. For example to do emotion recognition at the word level one can do away with the utterance fusion layers (for both speech and text) in the proposed architecture.

The information signals that are fused could be features extracted from the same signals (multiple feature streams), from multiple measurements of the same signal, e.g., multiple microphones or biosensors, from two different modalities that are not dependent or fully synchronous (crossmodal), or from the same signal that contains multiple modalities (multimodal).

Unimodal applications of this method include, but are not limited to, a system that exploits multiple views of a single signal from multiple measurement sources for example a system which identifies a speaker from multiple microphones. Another example is fusing different feature streams extracted from the same signal via our proposed method.

Cross-modal application of this method include, but are not limited to, fusion of two or more information streams that are independent to each other or not totally in synchrony, for example audio recordings and biological signals, or a video signal and the associated emotional reaction it induces on a human subject.

Multimodal applications of this method include, but are not limited to, fusion of two or more multimodal information streams such as audio and text or audio, text, and visual signals, e.g., in a video clip.

The models associated with each information signal and the fused representation can have arbitrary depth.

In general, the depth of the deep hierarchical fusion system could relate to the desired (or required) levels of abstraction. For example, a system fusing speech and text information streams for a classification task being performed for a spoken document could fuse information at the word level, at the utterance level, then at the document level.

Following the fusion layer that corresponds to the desired output time-scale, e.g., for emotion tracking the word level, for document classification the document level, for sentiment analysis the utterance level, an arbitrary number of layers can be added to both the information signal and fused models. These layers can be trained in an unsupervised manner to learn hierarchical representations as is customary in deep learning models.

An arbitrary level of layers can be also added at each time scale, e.g., the word level, to further improve the ability of the method to represent hierarchically the information and fused signals.

The fusion at each level of abstraction between various information streams can be achieved in a variety of ways including, but not limited to, concatenation, averaging, pooling, conditioning, product, transformation by forward or recursive neural network layers.

The fusion of the representation at each level of abstraction may also include a cross-modal attention module that takes as input the information signal representations and weighs their contribution towards the fused representation. This can be achieved by using attention information from one information stream to provide greater weight to certain segments from another information stream, such an attention mechanism could also perform the function of synchronizing information streams, e.g., synchronization of speech and physiological signals which are vary and are measured at different rates.

Furthermore, in another alternative, the single modal encoders are not frozen but instead allow for weight adaptation, potentially by using different optimizers for each modality. In some examples, different neural architectures for the single-modality encoders are used, such as pretrained CNNs that are able to extract high-level audio features. In some examples, different synchronization of the different layers of the single-modality encoders is used, as are deeper architectures.

Implementations of the approaches described above may be implemented in software, with processor instructions being stored on a non-transitory machine-readable medium and executed by one or more processing systems. The processing systems may include general purpose processors, array processors, graphical processing units (GPUs), and the like. Certain modules may be implemented in hardware, for example, using application-specific integrated circuits (ASICs). For instance, a runtime implementation may use of a hardware or partially hardware implementation, while a training implementation may use a software implementation using general purpose processors and/or GPUs.

REFERENCES

[1] S. Hochreiter and J. Schmidhuber, "Long short-term memory," *Neural computation*, vol. 9, no. 8, pp. 1735-1780, 1997.

[2] D. Bandanau, K. Cho, and Y. Bengio, "Neural machine translation by jointly learning to align and translate," *arXiv preprint arXiv:*1409.0473, 2014.

[3] A. Zadeh, R. Zellers, E. Pincus, and L.-P. Morency, "Mosi: multimodal corpus of sentiment intensity and subjectivity analysis in online opinion videos," *arXiv preprint arXiv:* 1606.06259, 2016.

[4] A. Zadeh, P. P. Liang, S. Poria, P. Vij, E. Cambria, and L.-P. Morency, "Multi-attention recurrent network for human communication comprehension," in *Thirty-Second AAAI Conference on Artificial Intelligence*, 2018.

[5] J. Pennington, R. Socher, and C. Manning, "Glove: Global vectors for word representation," in *Proceedings of the 2014 conference on empirical methods in natural language processing (EMNLP)*, 2014, pp. 1532-1543.

[6] A. Zadeh, M. Chen, S. Poria, E. Cambria, and L.-P. Morency, "Tensor fusion network for multimodal sentiment analysis," in *Proceedings of the 2017 Conference on Empirical Methods in Natural Language Processing*, 2017, pp. 1103-1114.

[7] G. Degottex, J. Kane, T. Drugman, T. Raitio, and S. Scherer, "Covarep a collaborative voice analysis repository for speech technologies," in *2014 ieee international conference on acoustics, speech and signal processing (icassp)*. IEEE, 2014, pp. 960-964.

[8] J. Yuan and M. Liberman, "Speaker identification on the scotus corpus," *Journal of the Acoustical Society of America*, vol. 123, no. 5, p. 3878, 2008.

[9] S. Poria, E. Cambria, and A. Gelbukh, "Deep convolutional neural network textual features and multiple kernel learning for utterance-level multimodal sentiment analysis," in *Proceedings of the 2015 conference on empirical methods in natural language processing,* 2015, pp. 2539-2544.

[10] Y. Gu, K. Yang, S. Fu, S. Chen, X. Li, and I. Marsic, "Multimodal affective analysis using hierarchical attention strategy with word-level alignment." in *Proceedings of the conference. Association for Computational Linguistics. Meeting,* vol. 2018, 2018, p. 2225.

[11] Y.-H. H. Tsai, P. P. Liang, A. Zadeh, L.-P. Morency, and R. Salakhutdinov, "Learning factorized multimodal representations," *arXiv preprint arXiv:* 1806.06176, 2018.

[12] R. Pascanu, T. Mikolov, and Y. Bengio, "On the difficulty of training recurrent neural networks," in *International conference on machine learning,* 2013, pp. 1310-1318.

[13] D. P. Kingma and J. Ba, "Adam: A method for stochastic optimization," *arXiv preprint arXiv:* 1412.6980, 2014.

[14] A. Paszke, S. Gross, S. Chintala, G. Chanan, E. Yang, Z. DeVito, Z. Lin, A. Desmaison, L. Antiga, and A. Lerer, "Automatic differentiation in pytorch," 2017.

What is claimed is:

1. A method for processing multi-modal input comprising:
receiving a plurality of signal inputs, each signal input having a corresponding input mode;
processing each signal input in a series of mode-specific processing stages,
    each successive mode-specific processing stage being associated with and performing processing at a successively longer scale of analysis of the signal input of the corresponding input mode; and
generating a fused output based on the output of a series of fused processing stages,
    each successive fused processing stage being associated with and performing processing at a successively longer scale of analysis of the signal input;
wherein multiple fused processing stages receive inputs from corresponding mode-specific processing stages corresponding to different input modes, whereby the fused output depends on the plurality of signal inputs;
wherein the series of mode-specific processing stages include:
    a first processing stage for a first input mode,
    a second processing stage for the first input mode,
    a first processing stage for a second input mode, and
    a second processing stage for the second input mode; and
wherein the series of fused processing stages include:
    a first fused processing stage, and
    a second fused processing stage; and
wherein:
    the first fused processing stage receives input from the first processing stage for the first input mode via a first output of said stage for the first input mode and from the first processing stage for the second input mode via a first output of said stage for the second input mode,
    the second processing stage for the first input mode receives input from the first processing stage for the first input mode via a second output of said stage,
    the second processing stage for the second input mode receives input from the first processing stage for the second input mode via a second output of said stage, and
    the second fused processing stage receives input from the second processing stage for the first input mode and from the second processing stage for the second input mode.

2. The method of claim 1 wherein the plurality of signal inputs represent a linguistically-based output from a subject, and wherein the method further comprises providing the fused output comprising a representation of a sentiment expressed in the linguistically-based output.

3. The method of claim 1 wherein the input modes corresponding to the signal inputs comprise an audio input mode.

4. The method of claim 3 wherein the input modes corresponding to the signal inputs further comprise a text input mode.

5. The method of claim 4 wherein the text mode input comprises an automated speech recognition of the audio mode input.

6. The method of claim 3 wherein the input modes corresponding to the signal inputs further comprise a video input mode, wherein the video mode input comprises a facial image of a speaker producing speech representing the audio mode input.

7. The method of claim 1 wherein the input modes corresponding to the signal inputs comprises a first timescale audio input mode and a second timescale audio input mode, wherein the second timescale is longer than the first timescale.

8. The method of claim 1 wherein the successively longer scales of analysis comprise a word scale analysis and a sentence or utterance scale analysis.

9. The method of claim 1 wherein at least some of the processing stages include feed-forward neural network encoders.

10. The method of claim 1 wherein at least some of the processing stages include long short-term memory (LSTM) networks.

11. The method of claim 10 wherein the inputs from the corresponding mode-specific processing stages comprise LSTM state values.

12. A non-transitory machine-readable medium having instructions stored hereon, wherein the instructions when executed by a computer processor cause processing of a multi-modal input, the processing comprising:
receiving a plurality of signal inputs, each signal input having a corresponding input mode;
processing each signal input in a series of mode-specific processing stages,
    each successive mode-specific processing stage being associated with and performing processing at a successively longer scale of analysis of the signal input of the corresponding input mode; and
generating a fused output based on the output of a series of fused processing stages,
    each successive fused processing stage being associated with and performing processing at a successively longer scale of analysis of the signal input;
wherein multiple fused processing stages receive inputs from corresponding mode-specific processing stages corresponding to different input modes, whereby the fused output depends on the plurality of signal inputs
wherein the mode-specific processing stages include:
    a first processing stage for a first input mode,
    a second processing stage for the first input mode,
    a first processing stage for a second input mode, and a second processing stage for the second input mode; and wherein the fused processing stages include:
   a first fused processing stage, and
   a second fused processing stage; and wherein:
   the first fused processing stage receives input from the first processing stage for the first input mode via a first output of said stage for the first input mode and from the first processing stage for the second input mode via a first output of said stage for the second input mode,
   the second processing stage for the first input mode receives input from the first processing stage for the first input mode via a second output of said stage,
   the second processing stage for the second input mode receives input from the first processing stage for the second input mode via a second output of said stage, and
   the second fused processing stage receives input from the second processing stage for the first input mode and from the second processing stage for the second input mode.

13. A multi-modal input processing system comprising:
a plurality of inputs, each input configured to receive an input signal of a plurality of input signals having a corresponding input mode of a plurality of input modes;
for each input mode of the plurality of input modes, a series of mode-specific processing stages,
   each successive mode-specific processing stage being associated with and performing processing at a successively longer scale of analysis of the input signal of the corresponding input mode,
   each mode-specific processing stage other than a first processing stage of said series being coupled to a prior processing stage of said series for receiving an output from said prior processing stage, and
   the first processing stage of said series being coupled to the input and configured to receive the input signal of said input mode;

a series of fused processing stages including a final fused processing stage of the series of fused processing stages providing an output of the multi-modal input processing system,
   each successive fused processing stage being associated with and performing processing at a successively longer scale of analysis of the signal input, and
   each successive fused processing stage is coupled to a respective mode-specific processing stage of each series of mode-specific processing stages associated with a same scale of analysis for receiving an output of said mode-specific processing stage;

wherein the mode-specific processing stages include:
   a first processing stage for a first input mode,
   a second processing stage for the first input mode,
   a first processing stage for a second input mode, and
   a second processing stage for the second input mode; and wherein the fused processing stages include:
   a first fused processing stage, and
   a second fused processing stage; and wherein:
   the first fused processing stage has a first input coupled to the first processing stage for the first input mode and a second input coupled to the first processing stage for the second input mode,
   the second processing stage for the first input mode has an input coupled to the first processing stage for the first input mode,
   the second processing stage for the second input mode has an input coupled to the first processing stage for the second input mode, and
   the second fused processing stage has a first input coupled to the second processing stage for the first input mode, a second input coupled to the second processing stage for the second input mode, and a third input coupled to the first fused processing stage.

* * * * *